United States Patent [19]
Griffeth et al.

[11] Patent Number: 5,504,837
[45] Date of Patent: Apr. 2, 1996

[54] METHOD FOR RESOLVING CONFLICTS AMONG DISTRIBUTED ENTITIES THROUGH THE GENERATION OF COUNTER PROPOSALS BY TRANSVERSING A GOAL HIERARCHY WITH ACCEPTABLE, UNACCEPTABLE, AND INDETERMINATE NODES

[75] Inventors: Nancy D. Griffeth, Westfield, N.J.; Hugo Velthuijsen, Den Haag, Netherlands

[73] Assignees: Bell Communications Research, Inc., Morristown, N.J.; PTT Research, Leidschendam, Netherlands

[21] Appl. No.: 59,947

[22] Filed: May 10, 1993

[51] Int. Cl.⁶ .............................. G06F 15/18; G06F 19/00
[52] U.S. Cl. .................. 395/11; 395/51; 395/54; 395/600; 364/274; 364/276.1; 364/276.8; 364/284; 364/284.4; 364/DIG. 1
[58] Field of Search .................... 395/600, 650, 395/700, 51, 54, 11; 364/274, 276.1, 276.8, 284.4, 284

[56] References Cited

U.S. PATENT DOCUMENTS

| | | | |
|---|---|---|---|
| 5,021,943 | 6/1991 | Grimes | 395/800 |
| 5,283,869 | 2/1994 | Adams et al. | 395/200.2 |
| 5,452,420 | 9/1995 | Engdahl et al. | 395/285 |

FOREIGN PATENT DOCUMENTS

| | | | |
|---|---|---|---|
| 5174000 | 7/1993 | Japan | G06F 15/20 |
| 9209164 | 5/1992 | WIPO | H04M 3/00 |

OTHER PUBLICATIONS

Laasri et al., "An Analysis of negotiation and its role for coordinating cooperative distributed problem solvers", *Proceedings of 11th International Conference on Expert Systems and Their Applications*, May 1991, Nanterre, France, pp. 81–94.

Gyirers, "Distributors Search Algorithm for Factory Control", Jun. 1991, pp. 200–206, The 4th Int. Nat. Conf. On Industrial & Eng. App. of AI & ES. V. 1.

Sycara, "Cooperative Negotiation In Concurrent Engineering Design" 1991, pp. 269–297, MIT-JSME Workshop Coop. Product Nov. 1989.

Lâasre et al. "A Generate Model Model for Intelligent Negotiating Agents" pp. 291–317, 1992 Internat. Jour. of Intel & Coop. Info. System V1 N2.

(List continued on next page.)

*Primary Examiner*—Thomas G. Black
*Assistant Examiner*—Jack M. Choules
*Attorney, Agent, or Firm*—Leonard Charles Suchyta; James W. Falk

[57] ABSTRACT

Communication among entities such as customer premises equipment (20, 22, 28) in a telecommunications network (10) is set up through the use of agents representing each entity (20, 22, 28). Agents representing corresponding entities in the telecommunications network (10) negotiate over the type of communication sessions in which the corresponding entities want to be involved. The negotiation process involves the exchange of proposals by agents. A proposal comprises one or more planned actions which can be taken in the network (10). One agent generates a proposal acceptable to it and transmits the proposal to another agent. The receiving agent determines if the received proposal is acceptable to it and if not generates a counterproposal. The process continues until a proposal acceptable to both agents is found or it is determined that there is no proposal for realizing the particular type of communication session which is acceptable to both agents. An agent determines whether a proposal is acceptable to it through use of a goal hierarchy. The goal hierarchy indicates whether or not specific actions for accomplishing a goal are acceptable. The use of the goal hierarchy permits an agent to infer another agent's goals, and to find alternate actions that achieve this goal. The negotiation process enables agents to reach agreement without modification of their goals and without requiring the disclosure of restricted information to other agents. The inventive negotiation method is also applicable to other distributed systems.

8 Claims, 3 Drawing Sheets

OTHER PUBLICATIONS

Werkman "Using Negotiation and Coordination in Multi-agent Cooperative Information Systems,"1992, pp. 251 . 270, Next Generation of Information Systems: From Data to Knowledge.

Griffith et al, "The Negotiating Agent Model for Rapid Feature Development", IEE Conf. Pub N352, 1992, pp. 67–71.

S. Cammarata et al., *Strategies of Cooperation in Distributed Problem Solving*, In Proceedings IJCAI–83, pp. 767–770, Karlsruhe, 1983.

R. Clark et al., *"Consensus: A Planning Protocol for Cooperating Expert Systems"*, In Proceedings 11th Workshop on Distributed Artificial Intelligence, pp. 43–58, Glen Arbor, Mich., Feb. 1992.

S. E, Conry et al., *"Multistage Negotiations for Distributed Constraint Satisfaction,"* IEEE Trans. on Systems, Man, and Cybernetic, 21(6):1462–1477, Nov./Dec. 1991.

R. Davis et al., *"Negotiation as a Metaphor for Distributed Problem Solving,"* Artificial Intelligence, 20:63–109, 1983.

E.H. Durfee et al., *"Negotiation Task Decomposition and Allocating Using Partial Global Planning,"* Chapter 10, pp. 229–243, Pitman, London, 1989.

S. Kraus et al., *"Negotiation in a Non–cooperative Environment,"* Journal of Experimental and Theoretical Artificial Intelligence, 1:255–281, 1991.

A. Sathi et al., *"Constraint–directed Negotiation of Resource Reallocation,"* In L. Gasser and M. N. Illuhns, editors, Distributed Artificial Intelligence, vol. II, Research Notes in Artificial Intelligence, Chapter 8, pp. 163–193, Pitman, London, 1989.

S. Sen et al., "A Formal Analysis of Communication and Commitment in Distributed Meeting Scheduling,"In Proceedings 11th Workshop on Distributed Artificial Intelligence, pp. 333–344, Glen Arbor, Mich., Feb. 1992.

K. P. Sycara, *"Argumentation:Planning Other Agents' Plans,"* In Proceedings IJCAI–89, pp. 517–523, Detroit, Mich., 1989.

F. von Martial, *"Coordination by Negotiation Based on a Connection Dialogue States with Actions,"In Proceedings 11th Workshop on Distributed Artificial Intelligence, pp. 227–246, Glen Arbor, Mich., Feb. 1992.*

R. Weihmayer et al. *"A Distributed AI Architecture for Customer Network Control,"*, In Proceedings IEEE Global Telecommunications Conference (GLOBE–COM '90), pp. 656–662, San Diego, Calif., 1992.

G. Zlotkin et al., *"Cooperation and Conflict Resolution Via Negotiation Among Autonomous Agents in Noncooperative Domains,"* IEEE Transactions on Systems, Man, and Cybernetic, 21(6):1317–1324, Nov./Dec. 1991.

H. A. Kautz, *"A Formal Theory of Plan Recognition and its Implementation,"* In J. F. Allen, H. A. Kautz et al, editors, Reasoning about Plans, Chapter 2, pp. 70–125, Morgan Kaufman Publishers, Inc., San Mateo, Calif., 1991.

METHOD FOR RESOLVING CONFLICTS AMONG DISTRIBUTED ENTITIES THROUGH THE GENERATION OF COUNTER PROPOSALS BY TRANSVERSING A GOAL HIERARCHY WITH ACCEPTABLE, UNACCEPTABLE, AND INDETERMINATE NODES

FIELD OF THE INVENTION

The present invention relates to a method for resolving conflicts among entities in a distributed system. A distributed system comprises a collection of autonomous independent or jointly developed systems or computer programs that can interact with each other. Examples of such distributed systems are telecommunications networks, distributed database systems, and distributed systems for computer supported cooperative work. In the present invention, a negotiation mechanism is used to resolve conflicts among entities. In accordance with the present invention, each entity in a distributed system such as a telecommunications network (e.g., subscriber, resource provider, information provider), or a distributed database system, is represented in a negotiation by a computer process known as an agent. The functions of an agent are to generate proposals for the performance of certain activities in the distributed system for transmission to other agents, to determine if proposals received from other agents are acceptable, and to generate counterproposals if necessary. Each agent uses a goal hierarchy to generate proposals and counterproposals and to determine whether proposals received from other agents are acceptable.

BACKGROUND OF THE INVENTION

A. Conflicts in Telecommunications Networks

There are at least three ways conflicts can arise in a distributed system such as a telecommunication network. One way is that users in a telecommunications network may disagree on the particular form of a communication session to be established among them. For example, party A may have an unlisted number, whereas party B may want to see the number of the calling party before accepting any call. When party A calls party B a conflict arises. This kind of conflict is called a session conflict because it involves disagreement over how a communication session should be established. Another example of a session conflict is when party A to a communication session wants to include a third party C but a second party B to the communication session does not want to include the third party.

In general, session conflicts involve disagreements over whether to establish communication or what the nature of the communication will be.

A second kind of conflict arises over the use of resources external to the network. For example, if telecommunication user A is at home and user B is visiting A's home, calls forwarded from B's home to A's home may conflict in their use of resources with calls to A. This kind of conflict is called a station conflict because it involves equipment at a user station.

A third kind of conflict involves the use of scarce. network resources. For example, a conference call requires special equipment called a bridge that combines the signals from multiple sources into a single signal. If too many conference calls are attempted simultaneously the network will not be able to provide enough bridges for them. This kind of conflict is called a resource conflict.

Some session conflicts and station conflicts occur as a result of what is called a feature interaction. A feature interaction arises when one feature in a telecommunications network interferes with the expected operation of another feature.

B. Negotiation Among Cooperating Systems

The above-described conflicts which arise in a telecommunications network are examples of the type of conflicts which distributed systems experience over which activities to perform. Such conflicts arise as the individual entities in the distributed systems make incompatible decisions because they base their decisions on different information or because they try to achieve different goals. To resolve conflicts, individual entities in a distributed system need to interact, exchanging information and possibly changing their own goals or trying to change the goals of other systems. The resulting interactions constitute a negotiation process.

In some negotiation mechanisms, an entity is represented by an agent. As used herein, the term agent refers to a computer process which represents a corresponding entity in a negotiation.

Typically, one agent sends another agent information about the goals it tries to achieve and the alternative plans to achieve the goals that are acceptable. This information forms a collection of proposals from which the other agent gets to pick one that is acceptable to it.

In some negotiation domains, the proposals and counterproposals which form the objects of negotiation can be represented by fixed sets of (numerical) attributes. In such cases, evaluation of proposals and generation of counterproposals may be implemented through a relatively simple combination of functions on those attributes. Examples of such domains are negotiations over price and features of a new car and negotiations for scheduling meetings. Negotiating agents are used in domains in which the objects of negotiation cannot be represented through such fixed sets of attributes. In such domains, a counterproposal may contain not only different values of the same attributes present in the proposal it responds to, but also entirely different attributes. Potentially, there are many attributes to chose from for incorporation in a counterproposal. But only some of them will seem relevant or 'reasonable' to a human observer. The negotiation method of the present invention involving the use of negotiating agents adds in such domains the following two current techniques for negotiation in DAI (Distributed Artificial Intelligence):

A method to evaluate proposals (determine acceptability or unacceptability).

A method to decide on what is a 'reasonable' counterproposal when a received proposal is not acceptable.

A wide variety of negotiating processes have been disclosed in the prior art related to distributed artificial intelligence. See, e.g., S. Cammarata, D. MacArthur, and R. Steeb, "Strategies of Cooperation in Distributed Problem Solving," In Proceedings IJCAI-83, pp. 767, 770, Karlsruhe, 1983; R. Clark, C. Grossher, and T. Radhakrishnan, "Consensus: A Planning Protocol for Cooperating Expert Systems," In Proceedings 11th Workshop on Distributed Artificial Intelligence, pp. 43, 58, Glen Arbor, Mich., February, 1992; S. E. Conry, K. Kuwabara, V. R. Lesser, and R. A. Meyer, "Multistage Negotiation for Distributed Constraint Satisfaction," IEEE Transactions on Systems, Man, and Cybernetic, 21(6):1462–1477, November/December 1991; R. Davis and R. G. Smith, "Negotiation as a Metaphor for Distributed Problem Solving," Artificial Intelligence, 20:63

109, 1983; E. H. Durfee and V. R. Lesser, "Negotiation Task Decomposition and Allocating Using Partial Global Planning," chapter 10, pp. 229–243, Pitman, London, 1989; S. Kraus, E. Ephrati, and D. Lehmann, "Negotiation in a Non-cooperative Environment," Journal of Experimental and Theoretical Artificial Intelligence, 1:255–281, 1991; A. Sathi and M. S. Fox, "Constraint-directed negotiation of Resource Reallocation," In L. Gasser and M. N. Huhns, editors, "Distributed Artificial Intelligence, Volume II," Research Notes in Artificial Intelligence, chapter 8, pp. 163–193, Pitman, London, 1989; S. Sen and E. H. Durfee, "A Formal Analysis of Communication and Commitment in Distributed Meeting Scheduling," In Proceedings 11th Workshop on Distributed Artificial Intelligence, pp. 333–344, Glen Arbor, Mich., February 1992; K. P. Sycara, "Argumentation: Planning Other Agents' Plans," In Proceedings IJCAI-89, p. 517, 523, Detroit, Mich., 1989; F. von Martial, "Coordination by Negotiation Based on a Connection of Dialogue States With Actions," In Proceedings 11th Workshop on Distributed Artificial Intelligence, pp. 227–246, Glen Arbor, Mich., February 1992; R. Weihmayer and R. Brandau, "A Distributed AI Architecture for Customer Network Control," In Proceedings IEEE Global Telecommunications Conference (GLOBE-COM '90), pp. 656, 662, San Diego, Calif., 1992; G. Zlotkin and J. S. Rosenschein, "Cooperation and Conflict Resolution Via Negotiation Among Autonomous Agents in Noncooperative Domains," IEEE Transactions on Systems, Man, and Cybernetic, 21(6):1317–1324, November/December 1991.

Several of the negotiation mechanisms are based on a hierarchical representation of goals and alternative ways to achieve these goals. The goal hierarchy is used for finding a plan that achieves the goals of all involved agents but that does not involve conflicting activities.

The hierarchies in R. Clark, C. Grossner, and T. Radhakrishnan, "Consensus: A Planning Protocol for Cooperating Expert Systems," In Proceedings 11th Workshop on Distributed Artificial Intelligence, pp. 43, 58, Glen Arbor, Mich., February, 1992, are AND/OR/XOR trees, where the nodes are goals. Rather than using a specification of a goal as a proposal, entire particular hierarchies are used as proposals. This approach involves the unconditional disclosure of more information in each proposal about an agent's goals and options than in the present invention. However, the protocol will settle on a compromise in a fixed and limited number of steps.

In the Multistage negotiation protocol (see, S. E. Conry, K. Kuwabara, V. R. Lesser, and R. A. Meyer, "Multistage Negotiation for Distributed Constraint Satisfaction," IEEE Transactions on Systems, Man, and Cybernetic, 21(6):1462–1477, November/December 1991), collections of plan fragments, which are organized in a hierarchy, are used as proposals. Other agents receiving proposals either select suitable plan fragments from the proposal or send notification that no acceptable plan fragment was included in the proposal. The hierarchy is not used to reason about other agents' goals, which are in any case derived from a global goal that is shared by all the agents. The approach, therefore, is more suited for a distributed problem-solving system than for an environment of autonomous agents.

K. P. Sycara, "Argumentation: Planning Other Agents' Plans," In Proceedings IJCAI-89, p. 517, 523, Detroit, Mich., 1989 uses a hierarchy to determine which arguments to use to influence other agents' evaluation of proposals. This hierarchy represents alternative ways of achieving goals. It is not used to determine the goals of the agents involved or to perform the actual evaluation of proposals.

The hierarchy used in R. Weihmayer and R. Brandau, "A Distributed AI Architecture for Customer Network Control," In Proceedings IEEE Global Telecommunications Conference (GLOBE-COM '90), pp. 656, 662, San Diego, Calif., 1990, is a tree, which represents only abstraction relationships (alternatives). Moreover, this hierarchy is not used to reason about other agents' goals. This hierarchy is used as a representation of alternative plans achieving an agent's own goals and can be used to generate subsequent proposals. Additional information (such as cost of an alternative or availability of alternatives at a certain level of abstraction) is passed between the agents to direct and coordinate the search processes through the agents' hierarchies.

However, the negotiation methods described in the prior art have several shortcomings. In particular, the prior art negotiation methods generally require the agents for the various entities to exchange a lot of information about which alternatives for achieving a goal are acceptable and which are not. In some applications such as a telecommunications network, information about which alternatives are acceptable to an agent and which alternatives are not acceptable to an agent is usually restricted, either because the information is strategic information (used to find an agreement that is most advantageous to an agent) or because it is private information (e.g., information about policies a subscriber would rather keep private such as call screening lists).

In addition, the prior art negotiation techniques do not provide satisfactory methods for enabling receiving agents to evaluate received proposals to determine their acceptability or unacceptability and to generate a counterproposal in the event a received proposal is unacceptable.

In particular, the prior art negotiation techniques do not allow a receiving agent which receives an unacceptable proposal from a transmitting agent to infer the goal of the transmitting agent and generate for transmission back to the transmitting agent a counterproposal which realizes the inferred goal.

It is an object of the present invention to overcome these shortcomings of the prior art negotiation methods.

SUMMARY OF THE INVENTION

In accordance with the present invention, various entities in a distributed system, such as a customer, or customer premises equipment, or network resources in a telecommunications network, are each represented by an agent. In the case of a telecommunications network, agents representing entities negotiate over the type of communication in which the corresponding entities want to be involved and cause the communication to be set up in a manner which avoids conflict between entities.

The negotiation process involves the exchange of proposals by agents. A proposal comprises one or more operations which can be taken by the telecommunications network. A first agent representing a first entity generates a proposal acceptable to it and transmits the proposal to a second agent representing a second entity. The second agent determines if the received proposal is acceptable to it, and if not, generates a counterproposal which is transmitted back to the first agent. The process continues until a proposal is found which is acceptable to both agents or it is determined that there is no proposal for realizing the particular type of communication session that is acceptable to both agents. If a proposal is found acceptable by both agents, the operations contained in the proposal are executed by the telecommunications network.

An agent uses a goal hierarchy to determine whether proposals are acceptable. The goal hierarchy indicates what operations an agent can and cannot instruct the telecommunications network to perform on behalf of its entity. The goal hierarchy is used by an agent to determine which proposals and counterproposals it can generate and transmit to other agents and to determine whether or not proposals received from other agents are acceptable. When an agent cannot agree to a proposal received from another agent, the receiving agent uses the goal hierarchy to infer the goal of the proposal and to try to find an alternative proposal, i.e., an alternative set of operations, that achieves the goal.

For example, a root goal (i.e., root operation) in a goal hierarchy might be call (A,B), i.e., place a call between A and B. The goal hierarchy for the root goal call (A,B) might contain different operations and combinations of operations by which the root goal call (A,B) can be carried out. One operation for implementing the goal call (A,B) is simple call (A,B) wherein A and B are connected by a simple call. Another operation for implementing call (A,B) is identified call (A,B) wherein identifying information about A is provided to B when the call arrives at B. The operations of the goal hierarchy are arranged in a tree in which as one moves from top to bottom the actions are increasingly specialized. For example, the root parent node may be call (A,B). The children nodes of the root parent node may be simple call (A,B) and identified call (A,B). These children nodes contain specialized operations for implementing the goal of the root or parent node. For a different type of parent node, e.g., identified call (A,B), the children, i.e., connect (A,B), and deliver info(A) may represent operations, i.e, connect A and B and deliver information about A to B, which are combined to form the operation of the parent node.

In accordance with the invention, for each agent, each node in a goal hierarchy is acceptable, unacceptable or left as indeterminate. Such marking of a goal hierarchy is usually based on a policy for the entity represented by the agent. For example, an entity in the form of a subscriber may have the policy of keeping its home telephone number secret. Thus any operation in a goal hierarchy requiring transmission of the home telephone number to another subscriber would be marked unacceptable. An agent uses the node markings to generate proposals and counterproposals and to determine whether proposals received from other agents are acceptable. For example, suppose an agent receives a proposal from another agent, and that proposal is unacceptable to the receiving agent. The receiving agent can move up the goal hierarchy to infer the goal of the unacceptable proposal. The receiving agent then determines if there is another operation or collection of operations which is acceptable for implementing that same goal. If so, it can be used as a counterproposal.

In some cases, in accordance with the invention, such as when more than two agents are involved in setting up a communication, the negotiation is conducted by a computer process known as a negotiator which receives proposals from and forwards proposals to various agents involved in the negotiation.

The inventive negotiation process for setting up a communication between entities in a distributed system such as a telecommunications network without conflict has a number of significant advantages. First, agents find alternative operations or sets of operations that achieve the goals of all involved agents rather than relying on the modification of their own or other agents' goals. In addition, the inventive process for setting up activities in a distributed system such as a telecommunications network provides restrictions on information disclosure. The restrictions apply to strategic information (e.g., information directly specifying which proposals will be acceptable to an agent) and sensitive information (e.g., information about policies a subscriber would rather keep private).

DETAILED DESCRIPTION OF THE INVENTION

Applicability of the Inventive Negotiating Method

In order to use the inventive method of negotiation, the underlying computer system preferably meets certain criteria. First, the system is accessible to some collection of users, and the users have certain goals that they try to achieve using the system. Second, the system provides an interface comprising operations that can be requested on behalf of any user and will be executed if the requester is authorized to execute it. Third, the operations are "owned" by some user, meaning that the operation can be executed only if the user authorizes the requester to execute the operation. Fourth, operations can be combined into plans, and these plans are used to achieve the users' goals.

An example of such a system is a telecommunications network using AIN (Advanced Intelligent Network) or IN (Intelligent Network) switches. The users are the customers, the service providers (e.g., the operating companies), and resource providers (operating companies and long distance carriers). The goals of the customers are to communicate in some fashion. The goals of the service providers and the resource providers are to make money by providing services or resources.

The operations are defined by the AIN (or IN) call model. There is one operation corresponding to each state transition in the basic call model and one corresponding to each building block (or SIB). The operations can be combined to set up calls of different sorts, including two-way and multi-way calls and voice-mail. (The operations of the basic call model must be combined as given in that call model.) When a customer goes off-hook, he or she specifies a goal of using the telephone network. Subsequent actions by the customer refine the specification of the goal, so that the customer may be trying to set up a call, or edit a screening list, or take some other action.

Another example to which the inventive method would apply is a distributed database system. The users include the owners of the database, the administrators, the data entry clerks, and people who query or update the database via high-level query languages. The operations include the standard database operations. In a typical distributed database, the administrator of each local database authorizes any operations on data in that database. Database operations are usually combined into transactions. A negotiation can be used to determine whether and when a transaction is executed; or to find an alternative transaction to execute.

In general, the method can apply to any computer system satisfying the above criteria.

A. Telecommunications Network

Figure 1:
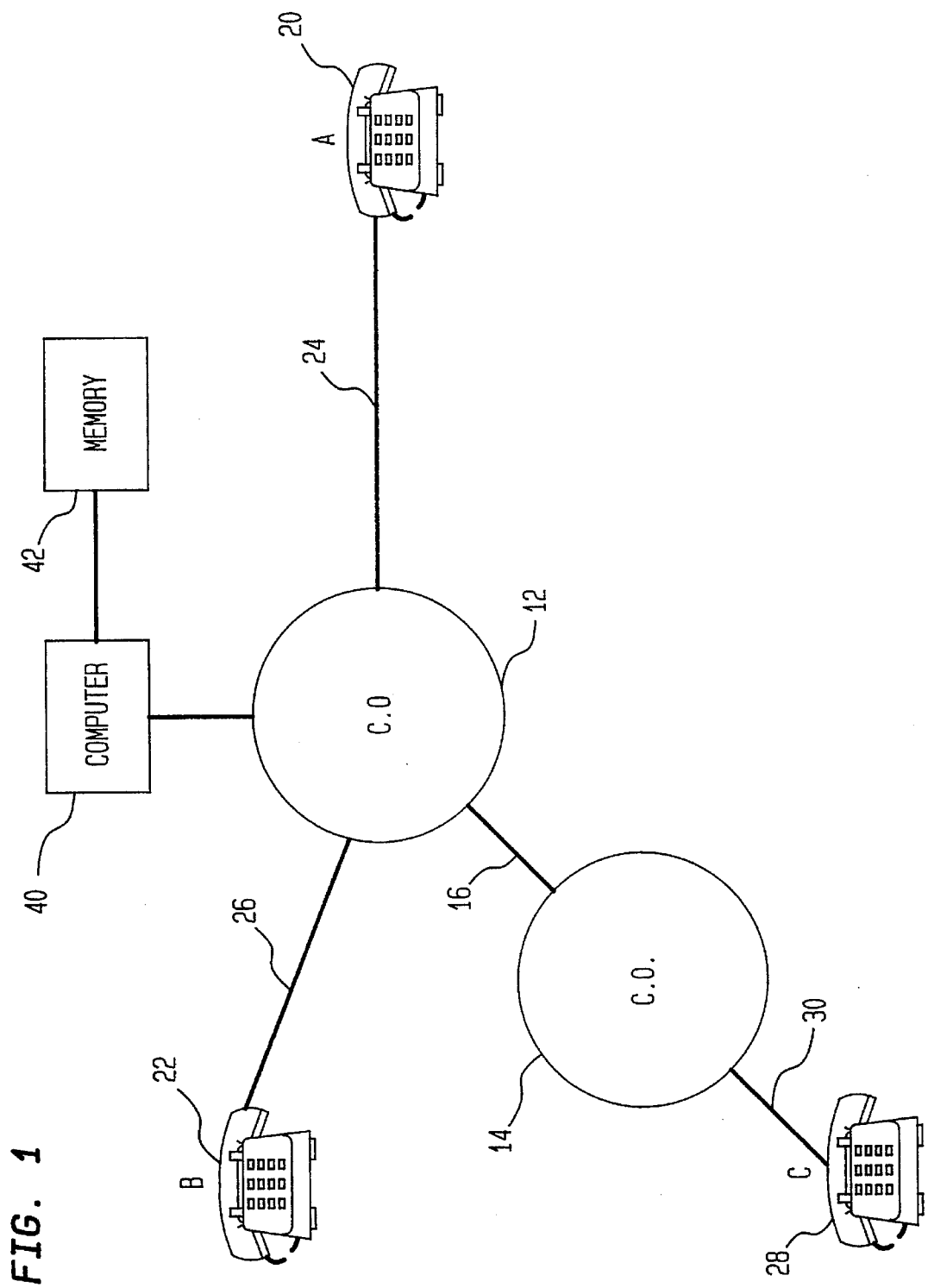
FIG. 1 schematically illustrates a telecommunications network which utilizes the negotiation process of the present invention to set up a communication between entities without conflict.

FIG. 1 schematically illustrate a telecommunications network 10 of a type which can be used to carry out the negotiation process of the invention. The network 10 comprises the central offices 12 and 14 which are connected by the trunk line 16. The central offices illustratively comprise AIN or IN switches. The customer premises equipment 20 of user A is connected to the central office 12 via the subscriber loop 24. The customer premises equipment 22 of user B is connected to the central office 12 via the subscriber loop 26. Similarly, the customer premises equipment 28 of user C is connected via the subscriber loop 30 to the central office 14. In general the customer premises equipment 20, 22, 28 of the users A, B, C may be telephones, fax machines, computers or various other devices for the transmission or reception of information via the telephone network.

Using the network 10, numerous different services may be offered. Various types of telephone services may be provided including simple point-to-point voice connections, and more specialized enhanced services such as a service in which the telephone number or other identifying information of a calling party is displayed at the customer premises equipment of a called party. In addition, using a bridge (not shown) located at one of the central offices, a teleconference may be set up among a plurality of users (e.g, users A, B,C). Another example of a service which can be provided in telecommunication network 10 is information retrieval. For example, the customer premises equipment 28 of user C may be a data base management system. Other users (e.g., A and B) may access the database management system via the network 10 to obtain specific information.

In accordance with the present invention, each entity (e.g., customer promises equipment, 20, 22, 28, bridge for teleconferencing, etc.) in the telecommunications network 10 is represented by an agent. The agent representing each entity is a computer process. Illustratively, the agent associated with each entity in a network 10 is executed in the computer 40 connected to the central office 12. The agents executed in the computer 40 make use of goal hierarchies which are stored in a memory 42 associated with the computer 40. The goal hierarchies are explained in greater detail below.

In some cases, where the entity (eog,. customer premises equipment) is itself a computer, the agent representing the entity may reside at the entity itself rather than at a computer associated with a central office. In some cases the agents for some entities may be located in a central office and the agents for other entities may be executed at the entity itself.

B. Negotiation Process

The negotiation process in accordance with the present invention is now considered in greater detail. First, an example of a simple negotiation process is provided. Then a process wherein the negotiation process is automated in accordance with the present invention is discussed.

1) Examples of negotiation process

In the network 10 of FIG. 1, consider the case where user A has an unlisted telephone number and user B has a calling number delivery service (i.e, the customer premises equipment 22 of user B allows user B to see the telephone number of the calling party). Thus, if user A tries to call user B via the network 10 a conflict arises. Specifically, because the user A with the unlisted number does not want his or her telephone number to be generally known, the unlisted number feature of user A appears to be incompatible with the calling number delivery feature of user B.

This conflict can be resolved by a negotiation between the agent of user A and the agent of user B which finds a way to set up the call between A and B without conflict.

Thus, the call between user A and user B may be set up as follows. The user A sends a messages via the network 10 to its agent in the computer 40 indicating that user A wants to call user B. The agent for user A communicates a proposal connect(A,B) to the agent for user B which also executes in the computer 40. This proposal comprises a proposed operation for setting up the call between A and B. The agent for user B receives the proposal connect(A, B) and determines that the proposal is unacceptable because it does not include the calling number. The agent for user B generates a counterproposal in the form of connect (A, B) and deliver number and transmits this proposal to the agent for A. The agent for A receives this proposal and notices the additional operation deliver number. A's agent finds the counterproposal unacceptable because it requires the additional operation of delivering A's unlisted telephone number to B. The agent for A then generates a counterproposal connect(A, B) and deliver name wherein the operation deliver name is substituted for the operation deliver number. This proposal is transmitted to the agent for B. The agent for B then accepts this proposal.

When a proposal is acceptable to the agents for all the entities involved in a proposed call, the proposal is transmitted from the computer 40 into the network 10, wherein the operation contained in the accepted proposal are executed.

The above-described negotiation between A and B is summarized in the following table:

| A | B |
|---|---|
| connect (A,B) | |
| | connect (A,B) and deliver number |
| connect (A,B) and deliver name | |
| | OK |

This example and the fact that an agreement is found hinges on the answers to an important question: why are the proposals subsequently exchanged reasonable? Why does A offer to provide a name upon reception of B's counterproposal, instead of offering, e.g., to pay more, or to include a third party in the call (each of which may be reasonable counterproposals in other situations).

The answer lies in the following observation. Typically, a proposal does not represent the ultimate goal of an agent, but merely one way to achieve an agent's goal. There might exist alternative ways to achieve the agent's goal as well. Such alternative ways to achieve the same goal provide room for negotiation. To explore these alternatives, it is necessary for an agent that receives an unacceptable proposal to recognize what goal the proposal tries to achieve and to derive from that goal alternative, possibly acceptable, ways to achieve the same goal. If an agent is not informed explicitly what goal another agent tries to achieve, the agent may be able to speculate about the goal, based on the information it does have, i.e,. the received proposal.

In the previous example, A received a proposal to set up a call with number delivery. This proposal in itself is unacceptable. However, in this example, A inferred that B's goal was not really to receive A's number, but rather to receive some identifying information (such as a name). This goal can also be achieved in other ways, e.g, by sending the name instead of the number. As sending the name is acceptable to A, this alternative is subsequently proposed. Thus a reasonable counterproposal to a proposal is one that achieves a same goal as that proposal.

2) Automation of the Neqotiation Process Using a Goal Hierarchy

In accordance with the present invention, the process by which agents generate proposals and counterproposals and the process by which agents determine whether proposals received from other agents are acceptable or unacceptable is automated. In particular, agents use a goal hierarchy to generate proposals and counterproposals and to determine whether proposals received from other agents are acceptable or unacceptable. The goal hierarchies for many different types of calls and communications sessions involving various entities in the telecommunications network 10 are stored in the memory 42 attached to the computer 40.

A collection of operations is provided by the system. A collection of operations forms a plan. When a plan is executed it achieves a goal. The simplest goal is to execute a single system operation; the plan for achieving this consists of just that one operation. Goals are related to each other by the abstraction and composition relations described below. The collection of abstraction and composition relations define a goal hierarchy.

Once the goal hierarchy has been defined, there is found a collection of plans for achieving each goal. These plans are called specifications, because they specify more precisely how to achieve the goal. A specification is a set of goals. One specification of a goal is just the set consisting of the goal itself. Other specifications are formed by applying some sequence of the following two operations to this specification:

Replace any abstract goal in the specification with one of the specializations (see definition below) of the abstract goal.

Replace any composite goal in the specification with all of the subgoals of the composite goal.

Steps of the second kind may expand the size of specifications by substituting several goals for a single goal.

We also define a refinement of a specification: A second specification refines a first if it is obtained by applying some sequence of the above two operations to the first specification.

Figure 2:
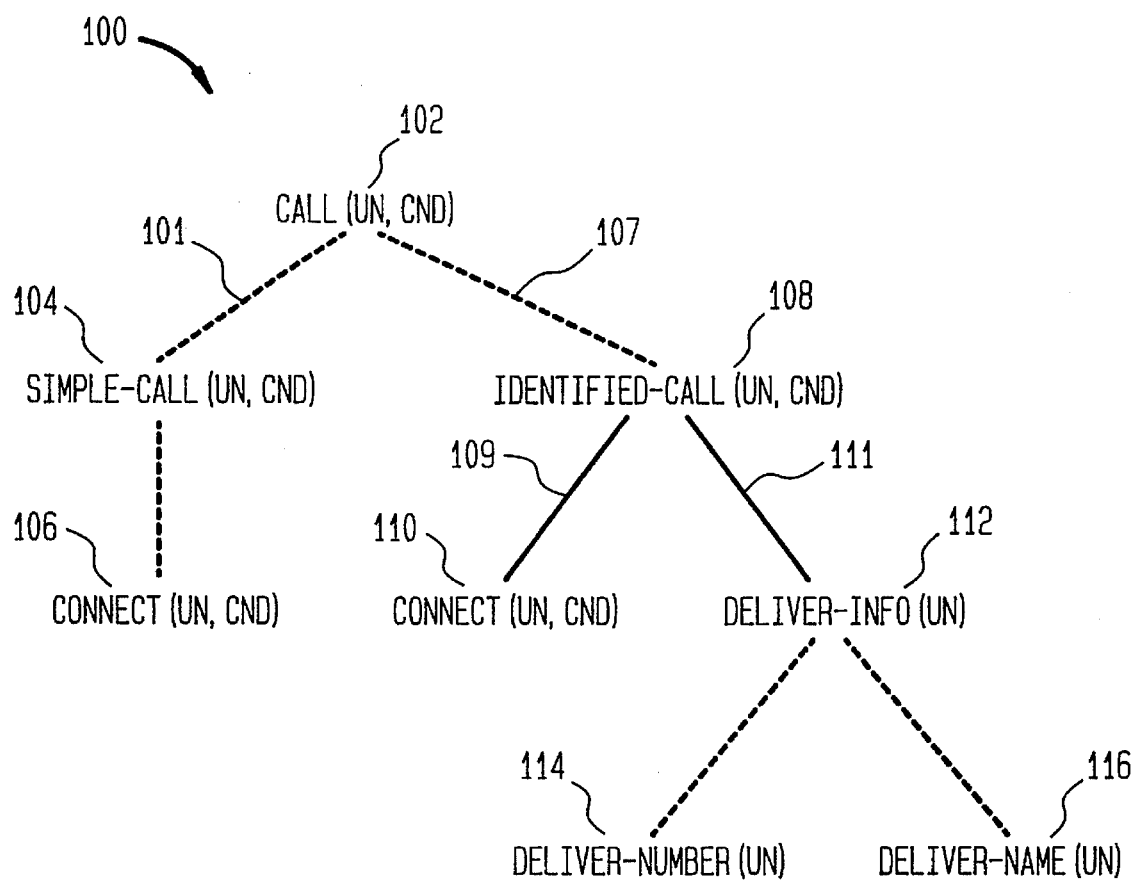
FIGS. 2, 3A and 3B illustrate a goal hierarchy utilized by an agent in a negotiation process in accordance with the present invention.

The goal hierarchy for the call type where user A has an unlisted number and call B has a calling number delivery service is illustrated in FIG. 2.

The goal hierarchy 100 of FIG. 2 comprises a plurality of nodes 102, 104, 106, 108, 110, 112, 114, 116. Each node represents a goal. As indicated above, the term goal as used herein refers to one or more operations which can be taken in the telecommunications network. Relationships among nodes in the goal hierarchy 100 are indicated by broken and solid lines. The relationship indicated by a broken line is known as an abstraction relation. An abstraction relation operates as follows: Consider the root node 102 which comprises the operation call (A,B). The node 102 has two children nodes 104 and 108 which are connected to the node 102 by broken lines 101 and 107. In this case, each child node 104 and 108 represents one specialized way of carrying out the goal of node 102. Thus the goal of node 102 call (A,B) may be carried out by the operation simple-call (A,B) of node 104 involving no transmission of information identifying A to B. The goal of node 102 may also be carried out by the operation identified call (A, B) of node 108 which involves transmitting identifying information about A to B. In general, each of nodes 104 and 108, which are connected to the node 102 by the broken lines 101 an 107, are referred to as specializations of the node 102. The node 102 is in turn referred to as an abstraction of the nodes 104, 108.

The goal of node 108 is a composite goal. The relationship between the goal of node 108 and its children nodes 110 and 112 is one of composition. Such composition relationships among nodes are indicated by solid lines such as the solid lines 109 and 111. In this case, the goal 108 is a composite goal and the goals 110 and 112 are component goals. A composite goal (e.g, goal 108) is only realized if all of its component goals (e.g, goals 110 and 112) are realized. As shown in the goal hierarchy of FIG. 2, the component goals of identified call (A, B) are connect (A, B) of node 110 and deliver info(A) of node 112. The abstract goal deliver info (A) of node 112 may be realized by the specialized goal deliver number (A) of node 114 or the specialized goal deliver name (A) of node 116. Hierarchies of the type shown in FIG. 2 have been described for plan recognition (see, e.g., H. A. Kautz, "A formal theory of plan recognition and its implementation". In J. F. Allen, H. A. Kautz, R. N. Pelavin, and J. D. Tenenberg, editors, "Reasoning about Plans", chapter 2, pages 70–125, Morgan Kaufmann Publishers, Inc., San Mateo, Calif. 1991).

In accordance with the present invention, agents generate proposals and counterproposals for transmission to other agents and receive proposals and counterproposals generated by other agents. All of the proposals and counterproposals are formed by constructing a specification of a goal as described above. The agents also use the goal hierarchy such as the goal hierarchy of FIG. 2 to determine whether a proposal is acceptable or unacceptable.

3) Acceptability of Proposals.

A proposal is acceptable to an agent if its corresponding entity would agree to it. A proposal is unacceptable if the entity would not agree to it. Thus, each goal (i.e, node) of a goal hierarchy is marked acceptable, unacceptable or is unmarked. When a goal is unmarked it is indeterminate.

4) Acceptability of Proposals

A proposal is acceptable if it is a specification of an acceptable goal.

A proposal is unacceptable if it is a specification of an unacceptable goal.

A classification of goals as acceptable and unacceptable is consistent if and only if no specification is a specification of both an acceptable goal and an unacceptable goal.

Two additional rules can be used to deduce the acceptability or unacceptability of specifications of composite goals from the acceptability or unacceptability of the components of the composite goal. Suppose that the composite goal g is not classified as acceptable or unacceptable. Let $h_1, \ldots, h_n$ be its component goals and let $H_i$ be an acceptable specification of $h_i$ for each i, i=1, ..., n,. Then the specification $G=\cup^n_{i=1} H_i$ is an acceptable specification of g. In addition, if the specification $H_i$ is unacceptable then, $G=\cup^n_{i=1} H_i$ is an unacceptable specification of g. Applying these rules to goals, it can be deduced that a composite goal that has not been explicitly classified is unacceptable if one of its components is unacceptable.

Each user should mark the goals in the hierarchy consistently with the above rules. To verify that no specification will be determined to be both acceptable and unacceptable, we extend the classification of goals as far as passible. We call the resulting classification of goals a complete marking of the hierarchy. If no goal is classified both acceptable and unacceptable in the complete marking, then the marking of the hierarchy is consistent, that is, every specification is exactly one of acceptable, unacceptable, or indeterminate.

We extend the classification as follows:

Starting from the highest level nodes and proceeding by level down the hierarchy, if an abstract goal is acceptable, mark of all its children as acceptable and if it is unacceptable, mark all of its children are unacceptable.

Starting from the lowest level nodes and proceeding by level up the hierarchy, if all of the children of an abstract goal are acceptable, mark it as acceptable; if all of the children of an indeterminate composite goal are acceptable, mark it as acceptable; if all of the children of an abstract goal are unacceptable, mark it as unacceptable; and if any child of an indeterminate composite goal is unacceptable, mark it as unacceptable.

Once these steps have been performed once, in the above order, the marking of the hierarchy is complete.

Figure 3A:
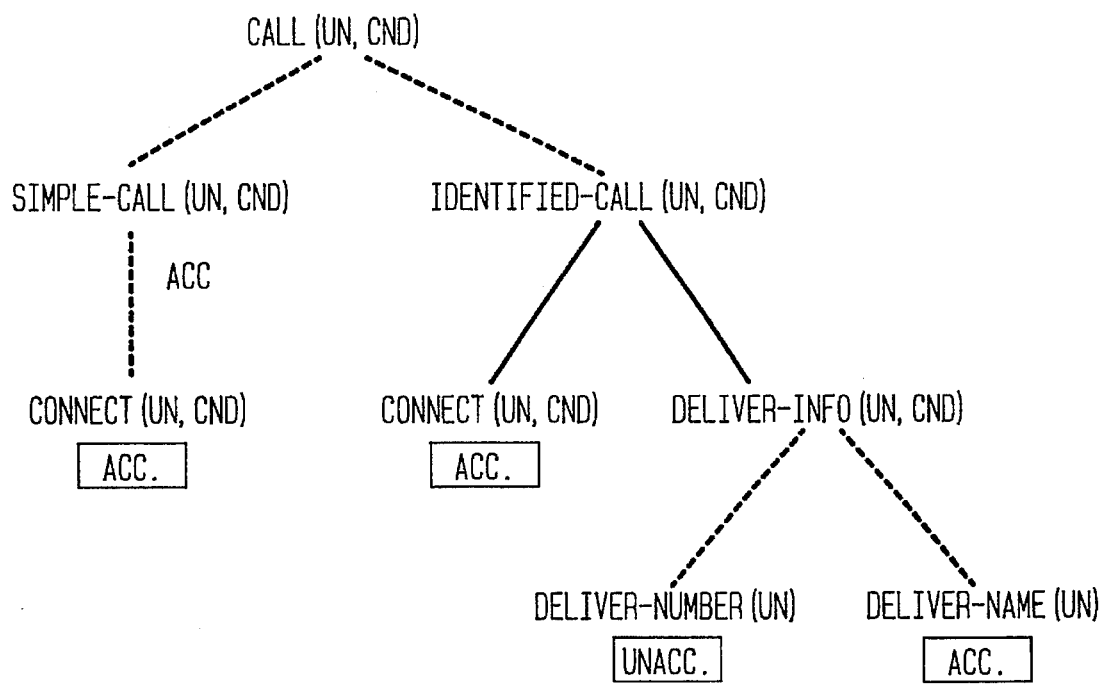
Figure 3B:
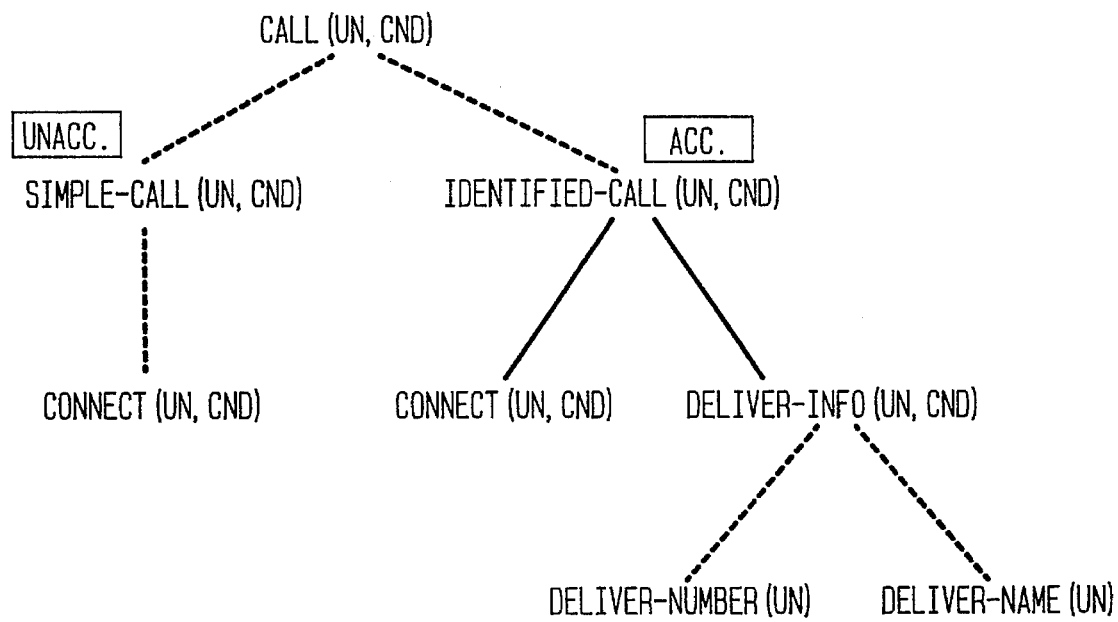

The goal hierarchy of FIG. 2 with markings indicating acceptable and unacceptable goals for user A is shown in FIG. 3A. The goal hierarchy of FIG. 2 with markings indicating acceptable and unacceptable goals for user B is shown in FIG. 3B. (In general, the goal hierarchy for multiple different types of telecommunications sessions involving various different entities are stored in the memory 42 of FIG. 1 along with markings indicating the acceptability and unacceptability of the goals of the different nodes to particular agents representing particular entities).

5) Use of Goal Hierarchy in Negotiation Process

A negotiation process is initiated when an entity (e.g., a subscriber) communicates to the associated agent that a goal is to be realized. For example, subscriber A may communicate to its agent that it wants to realize the goal call (A, B). This goal itself may not be marked as acceptable in the goal hierarchy for call (A, B) as used by A's agent (see FIG. 3A). Assuming, however, that the goal is not unacceptable, an acceptable specification of that goal should exist. The goal hierarchy is searched to find a specification of the goal call (A, B) which is marked acceptable in the goal hierarchy used by the receiving agent. In this case the acceptable specification of call (A, B) is simple call (A,B). This specification is then transmitted as an initial proposal by the agent for A to the agent for B.

When a proposal or counterproposal is received by an agent, the receiving agent has to decide whether the proposal or counterproposal is acceptable. If the proposal contains just a single goal that is marked acceptable in the goal hierarchy used by the receiving agent, the receiving agent can agree to it. If the proposal is a specification of a goal (i.e., node) marked acceptable, the proposal is acceptable.

If a received proposal is determined to be unacceptable or indeterminate according to the goal hierarchy of the receiving agent, a counterproposal needs to be generated. In the event, a received proposal is indeterminate, the counterproposal is generated by the receiving agent by moving down the goal hierarchy, to try to find a specification of the indeterminate goal which is acceptable. If such an acceptable specification is found, it is transmitted as a counterproposal. If the received proposal is determined to be unacceptable, a counterproposal is generated by the receiving agent by moving up the hierarchy to see if there is any indeterminate goal achieved by the unacceptable proposal. Then the receiving agent moves down the hierarchy along another branch to see if there is some other specification of the indeterminate abstract goal which is acceptable. Such an acceptable specification is then used to generate a counterproposal. (Note this is exactly the type of "win-win" negotiation strategy which is often used in business. In a typical business negotiation, when a first party makes a proposal, a second party determines whether the proposal is acceptable or unacceptable. If the second party cannot accept the proposal, he/she often asks: "What are you trying to accomplish in making that proposal, i.e, what is your goal." The first party then identifies his/her goal. The second party might then say, I have a different way of accomplishing your goal which is acceptable to me.)

In the case of the call between A and B described above, consider the following examples of acceptable, unacceptable and indeterminate proposals and counterproposals.

1. The agent for A receives from the corresponding entity an instruction to implement the goal call (A,B). The agent A searches the goal hierarchy to find an acceptable way to carry out the goal call (A,B). The goal call (A,B) is indeterminate in the goal hierarchy used by the agent for A. Thus, the agent for A searches the goal hierarchy (FIG. 3A) by moving down to find a specification of the goal call (A,B) which is acceptable. The acceptable specification in the goal hierarchy of FIG. 3A is connect (A,B). A proposal in the form of connect (A,B) is transmitted to the agent for B. The agent for B receives the proposal connect (A,B) and determines from the goal hierarchy of FIG. 3B that the proposal is unacceptable. p1 2. To generate a counterproposal, the agent for B moves up the goal hierarchy of FIG. 3B to find an abstraction of the goal connect (A,B) which is indeterminate. The abstraction which is indeterminate is call (A,B). Then the agent for B moves down the hierarchy to find another specification of call (A,B) which is acceptable. An acceptable specialization is identified call (A,B). This goal is transmitted from the agent for B to the agent for A as a counterproposal.

3. The proposal identified call (A,B) is received by A's agent. A's agent examines its goal hierarchy (FIG. 3A) and notes that the proposal identified call (A,B) is indeterminate. The agent for A then moves down its goal hierarchy to find a specification of identified call (A,B) which is acceptable. The acceptable specification of the composite goal identified call (A,B) is connect (A,B) and deliver name (A). (This is an acceptable specification of a composite goal because it comprises an acceptable specification of each individual component of the composite goal.) This counterproposal is transmitted to the agent for B.

b 4.The agent for B, using the goal hierarchy of FIG. 3B, determines the received proposal connct (A,B) and deliver name (A) is acceptable.

Thus, the agents for A and B have reached an agreement on a proposal made of planned actions for establishing the communication between the entities A and B. An instruction is therefore transmitted from the computer 40 to the central office 12 (See FIG. 1) to execute the agreed upon proposal.

The iterative generation of proposals and counterproposals constitutes a search process through a goal hierarchy to find a proposal (i.e., a node) that achieves the original goal of the agent that the initiated the negotiation and is acceptable to all involved agents. The exchange of proposals terminates when either a proposal acceptable to all involved agents is found or it is determined that it is not possible for the agents to reach an agreement.

It is determined that no agreement can be reached when each and every proposal acceptable to the initiating agent has been tried, i.e., has been transmitted to or received from the other involved agents, and no agreement has been reached.

6) Use of a Negotiator

In some cases such as when more than two agents are involved in a negotiating session, an intermediary in the form of a computer process known as a negotiator may be used to receive proposals from agents and transmit proposals to agents. In an illustrative embodiment of the invention, when a negotiator is involved, the negotiation process illustratively involves the following elements.

Goal Hierarchy.
1. All agents have the same goal hierarchy, but for different agents different nodes may be marked acceptable or unacceptable, etc.
2. The number of goals (i.e., nodes) in the goal hierarchy is finite.

Negotiator.
1. The negotiator queues every proposal it receives and sends every proposal it receives to the initiating agent and to all other involved agents in a FIFO (first in, first out) order, unless the negotiation terminates first or some agent responds NO to a proposal first.
2. If the negotiator has sent all proposals it has received before it has received a NO response from the initiating agent, it will send a QUERY to the initiating agent. p1
3. The negotiator terminates the negotiation if
   (a) for some proposal P, the initiating agent and all other involved agents have informed the negotiator they accept proposal P. In this case, the agreed solution is executed in the telecommunications network.
   (b) For some proposal P, the initiating agent responds NO to the negotiator.
4. The negotiator sends a proposal to an agent only once.

Agents.
1. When an agent receives a proposal from the negotiator, it can respond YES (it agrees), respond NO or send a counterproposal.
2. When an initiating agent receives a QUERY from the negotiator, it can respond NO or send a proposal.
3. An agent only sends a proposal to the negotiator if the proposal is acceptable to it.
4. An agent responds NO to a proposal or to a QUERY, if for each proposal Q that is acceptable to the agent it has either received Q from the negotiator or has sent Q to the negotiator (This means that all proposals acceptable to an agent must have been proposed by the agent or some other agent before the agent can respond NO).
5. An agent sends a proposal to the negotiator only once.

7) Use of a Negotiator

A detailed description of a negotiation algorithm used by the negotiator and agents is set forth below. The first section describes the actions of the negotiator and the second describes the actions of an agent. ps The Negotiator When the negotiator receives an initial proposal, it staxts a new negotiation by initializing various data structures. The data structures are:

$\mathcal{H}$—a set of all proposals that the negotiator has sent to the agents.

$\mathcal{Q}$—a queue of pairs (P, A), where P is an untried proposal and A is the agent that sent it to the negotiator.

$\mathcal{A}$—the set of all agents involved in the negotiation.

After initializing the data structures, the negotiator determines which agents are required to authorize the proposal and sends the proposal to them for evaluation. For a proposal P, we denote this set of agents agents(P).

Initial proposal P from initiating agent $A_I$

Initialize the data structures $\mathcal{H}$, $\mathcal{Q}$, and $\mathcal{A}$ to empty.

Add (P, $A_I$) to the end of the queue $\mathcal{Q}$ and initiate a round of negotiation.

A round of negotiation involves sending a proposal to the gents for evaluation and collecting the responses. In the first step of a round, the negotiator sends the proposal to the initiating agent (unless the proposal was sent by the initiating agent) to determine if it achieves the initiating agent's goal and is acceptable to the initiating agent. If the initiating agent accepts the proposal, the negotiator then sends it to the other agents required to authorize it and collects their responses. The negotiation process may consist of many such rounds. A round of negotiation using the proposal P is initiated by the following actions on the part of the negotiator:

Initiate a round

If the queue $\mathcal{Q}$ is nonempty, remove a proposal <P, A> from the front of $\mathcal{Q}$.

Repeat while (P∈$\mathcal{H}$) and ($\mathcal{Q}$ is not empty): remove a proposal <P,A> from the front of $\mathcal{Q}$. (This step guarantees that a proposal is sent at most once.) p1 If P∈$\mathcal{H}$, then (since $\mathcal{Q}$ must be empty) terminate the negotiation unsuccessfully (no agreement was found). p1 Add P to the history $\mathcal{H}$. p1 If A is not $A_I$ (the initiating agent), send P to $A_I$ and wait for its response:

If $A_I$ responds with counter-proposal Q, add <Q, $A_I$> to the end of the queue Q, and terminate this round.

If $A_I$ responds no, terminate this round. (This step guarantees that the initiating agent agreed to the proposal.)

(If the negotiator reaches this step, either A=$A_I$ or $A_I$ accepted the proposal P.) Add all agents in agents(P) to $\mathcal{A}$.

For each A ∈ agents(P), set variables approved[A] and responded[A] to false.

Send the proposal to every agent in agents(P) and collect responses.

The events that the negotiator must react to are: receipt of an initial proposal (described above) and receipt of a response (yes, no, or a counter-proposal).

Response from agent A

Set responded[A] to true.

If the response is yes then set approved[A] to true. p1 If the response is no then set approved[A] to false. (Receiving a no from an agent other than the initiating agent means only that the responding agent cannot be involved in any solution. But there may be a solution involving different agents.)

If the response is a counter-proposal Q∈$\mathcal{H}$ and there is no agent B such that <Q,B> ∈ $\mathcal{Q}$ then add <Q,A> to the end of the queue $\mathcal{Q}$.

If responded[A]=true for every agent A ∈ agents($P_{current}$) then

If approved[A]=true for every agent A ∈ agents($P_{current}$), then

Terminate the negotiation with solution $P_{current}$.

Send accepted to all agents in agents($P_{current}$).

Send done to all agents int $\mathcal{A}$-agents($P_{current}$).

If approved[A]=false for at least one agent A∈ agents($P_{current}$), then terminate this round and initiate a new round of negotiation.

The negotiator does not terminate the negotiation until either a solution has been found or the queue of counter-proposals is empty. The negotiator sends all proposals P that it receives to all of the agents in agents(P), unless some agent has already rejected the proposal. If an agent responds no if and only if the current proposal is unacceptable and it has already sent all acceptable proposals to the negotiator, then the negotiator works as required to guarantee that a solution is found.

The Agents

The agents must respond to proposals and to the messages that terminate negotiation. The initiating agent must remember its initial goal, and reject any proposal that is not a specification of that goal (regardless of its acceptability). The initiating agent sets the variable G equal to its initial goal. All agents maintain a history $\mathcal{H}$ of proposals they have sent and received. They set $\mathcal{H}=\emptyset$ initially. The initiating agent and the other agents will respond to a received proposal P in the following way.

The Initiating Agent

Add P to $\mathcal{H}$.

If P is an acceptable specification of G then respond with yes.

If P is not acceptable or is not a specification of G then
  If there is an acceptable specification R of G such that
    R ∈ $\mathcal{H}$ then
    add R to $\mathcal{H}$.
    respond with R.
  if there is no acceptable specification R of G such that
    R ∈ $\mathcal{H}$ then respond with no.

We do not specify how to pick the specifications here.

Other Agents

Add P to $\mathcal{H}$.

If P is acceptable then respond yes.

If P is not acceptable then
  if there is an acceptable specification R ∈ $\mathcal{H}$ then
    add R to $\mathcal{H}$.
    respond with R.
  if there is no acceptable specification R ∈ $\mathcal{H}$ then
    respond with no.

This procedure can be more efficient, without losing the guarantee of finding a solution if one exists, because we can reduce the number of proposals that the non-initiating agents send. The idea is that the non-initiating agents won't propose specifications unless they might be specifications of the initiating agent's goal. Note that every specification that reaches a non-initiating agent achieves the initiating agent's goal. Thus the non-initiating agents can deduce what the initiating agent's goal is from the sequence of specifications, as follows: Let $\mathcal{I}$ be the set of goals inferred from the negotiation so far. $\mathcal{I}$ is iteratively refined by determining what goals the current proposal is a specification of, and intersecting this set of goals with the current value of $\mathcal{I}$. Then we reduce the number of proposals sent by requiring that each proposal that an agent sends achieves some goal in $\mathcal{I}$; This effectively reduces the search space of proposals.

All Agents—terminating messages accepted or done

Set $\mathcal{H}$ to empty.

Note that an agent agrees to a proposal only if the proposal is acceptable and doesn't respond no unless it has received an unacceptable proposal and also has either received or sent all acceptable proposals meeting the goal G.

C. Conclusion

In short, a negotiation process for resolving conflicts in a distributed system such as a telecommunications network has been disclosed. In the negotiation process, each entity is represented by an agent. The agents use goal hierarchies to generate proposals and counterproposals for transmission to other agents and as to determine the acceptability of proposals received from other agents. The inventive negotiation process permits agreements to be reached for setting up activities between entities in a distributed network (such as communications in a communications network) without requiring agents to change their goals and without requiring agents to share restricted information. It is a particular advantage of the inventive negotiation process that when a receiving agent receives an unacceptable proposal from a transmitting agent, the receiving agent can use the goal hierarchy to infer a goal of the transmitting agent. The receiving agent can also use the goal hierarchy to try to find an alternative proposal which is acceptable to the receiving agent and which also meets the inferred goal of the transmitting agent. In the illustrative embodiment of the invention described above, all agents involved in a negotiation use the same goal hierarchy, but with different acceptability or unacceptability markings. However, in an alternative embodiment of the invention, different agents participating in a negotiation may utilize different goal hierarchies.

Finally, the above described embodiments of the invention are intended to be illustrative only. Numerous alternative embodiments of the invention may be devised by those skilled in the art without departing from the spirit and scope of the following claims.

We claim:

1. A method for establishing an activity among two or three entities in a distributed system with each entity represented by an agent comprising the steps of:

each agent generating proposals comprising operations that can be taken in said distibuted system acceptable to said each agent for transmission to other agents and determining if proposals received from said other agents are acceptable or unacceptable to said each agent by searching a goal hierarchy comprising nodes made up of operations which are acceptable or unacceptable or are indeterminate.

exchanging proposals among agents representing said entities until all of said agents determine that a proposal is acceptable or it is determined that no agreement can be reached, each of said agents after receiving a proposal which is determined to be unacceptable searching said goal hierarchy for a counterproposal by moving up the goal hierarchy to find an indeterminate node and then moving down the goal hierarchy to find a specification which is acceptable and transmitting said specification to said counterproposall to another agent, and when said agents all determine that a particular proposal is acceptable, executing in said distributed system the operations in said particular proposal.

2. The method of claim 1 wherein said proposals are exchanged among said agents through use of a negotiator.

3. The method of claim 1 wherein proposals are exchanged among said agents directly.

4. The method of claim 1 where all of said agents utilize the same goal hierarchy.

5. The method of claim 1 wherein said agents utilize different goal hierarchies.

6. The method of claim 1 wherein said distributed system is a communications network and said activity is a communication among entities.

7. A method for setting up a communication among two or more entities in a communications network comprising the steps of:

representing each of said entities by an agent, each agent generating proposals for transmission to other agents and for determining whether or not proposals received from other agents are acceptable, said proposals comprising operations which can be executed in said communications network, generating said proposals for transmission to other agents and determining the acceptability of said proposals received from other agents by accessing stored information indicating the acceptability or unacceptability of particular operations, said stored information being in the form of a goal hierarchy, each of whose nodes comprise operations and wherein for each agent each node is acceptable, unacceptable or indeterminate, and wherein when an agent receives a proposal from another agent corresponding to a node marked unacceptable in the goal hierarchy the agent searches the goal hierarchy for a counterproposal by moving up the goal hierarchy until an indeterminate node is reached and then moving down the goal hierarchy to find an acceptable specification of the indeterminate node, and executing the operations of a particular proposal in said network when said agents of said entities agree that said particular proposal is acceptable.

8. The method of claim 7 wherein said information permits an agent receiving a proposal from another agent to infer a goal of said other agent and to generate a counterproposal which implements said goal of said other agent.

* * * * *